United States Patent
Sinclair et al.

(10) Patent No.: US 8,015,530 B1
(45) Date of Patent: Sep. 6, 2011

(54) METHOD OF ENABLING THE GENERATION OF RESET SIGNALS IN AN INTEGRATED CIRCUIT

(75) Inventors: Martin Sinclair, Eskbank (GB); Gareth D. Edwards, Edinburgh (GB); Nathan A. Lindop, Musselburgh (GB)

(73) Assignee: Xilinx, Inc., San Jose, CA (US)

( * ) Notice: Subject to any disclaimer, the term of this patent is extended or adjusted under 35 U.S.C. 154(b) by 389 days.

(21) Appl. No.: 12/186,414

(22) Filed: Aug. 5, 2008

(51) Int. Cl.
*G06F 17/50* (2006.01)
(52) U.S. Cl. .......................... 716/116; 716/113; 326/40
(58) Field of Classification Search ................. 716/113, 716/116; 326/40
See application file for complete search history.

(56) References Cited

U.S. PATENT DOCUMENTS

| | | | |
|---|---|---|---|
| 5,717,942 A * | 2/1998 | Haupt et al. ................ 712/13 |
| 6,028,446 A * | 2/2000 | Agrawal et al. ................ 326/40 |
| 6,195,774 B1 * | 2/2001 | Jacobson ................ 714/727 |
| 6,647,508 B2 * | 11/2003 | Zalewski et al. ................ 714/3 |
| 6,766,389 B2 | 7/2004 | Hayter et al. |
| 6,857,110 B1 * | 2/2005 | Rupp et al. ................ 716/136 |
| 7,028,270 B1 * | 4/2006 | Lam et al. ................ 716/117 |
| 7,235,999 B2 * | 6/2007 | Goetting et al. ................ 326/9 |
| 7,337,422 B1 * | 2/2008 | Becker et al. ................ 716/121 |
| 7,389,489 B1 * | 6/2008 | Chesal et al. ................ 716/103 |
| 7,552,415 B2 | 6/2009 | Sanchez et al. |
| 7,594,211 B1 * | 9/2009 | Tian et al. ................ 716/113 |
| 2005/0094446 A1 | 5/2005 | Terazawa et al. |
| 2005/0169318 A1 | 8/2005 | Minemura et al. |
| 2008/0244491 A1 | 10/2008 | Ganesan et al. |

OTHER PUBLICATIONS

U.S. Appl. No. 12/329,881, filed Dec. 8, 2008, Sinclair.
U.S. Appl. No. 12/140,506, filed Jun. 17, 2008, Sinclair et al.

* cited by examiner

*Primary Examiner* — Naum Levin
(74) *Attorney, Agent, or Firm* — John J. King; Lois D. Cartier

(57) ABSTRACT

A method of enabling the generation of reset signals in an integrated circuit is disclosed. The method comprises receiving information related to reset ports for a plurality of intellectual property cores in a design tool; providing an intellectual property core comprising a reset logic circuit adapted to generate a plurality of reset signals for the plurality of intellectual property cores; and generating, by the design tool, configuration data enabling programmable interconnects to couple a first reset signal of the plurality of reset signals to a first intellectual property core of the plurality of intellectual property cores and a second reset signal of the plurality of reset signals to a second intellectual property core of the plurality of intellectual property cores.

20 Claims, 8 Drawing Sheets

METHOD OF ENABLING THE GENERATION OF RESET SIGNALS IN AN INTEGRATED CIRCUIT

FIELD OF THE INVENTION

The present invention relates generally to integrated circuits, and in particular, to a method of enabling the generation of reset signals in an integrated circuit.

BACKGROUND OF THE INVENTION

Integrated circuits are an integral part of any electronic device. A variety of integrated circuits are often used together to enable the operation of the electronic device. While integrated circuits are typically designed for a particular application, certain integrated circuits may have configurable logic.

For example, an application specific integrated circuit (ASIC) may have portions comprising configurable logic. Another type of integrated circuit which has configurable logic is a programmable logic device (PLD). A programmable logic device is designed to be user-programmable so that users may implement logic designs of their choices. One type of programmable logic device is a Complex Programmable Logic Device (CPLD). A CPLD includes two or more "function blocks" having a two-level AND/OR structure connected together and to input/output (I/O) resources by an interconnect switch matrix. Another type of programmable logic device is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell. However, reset schemes for individual circuits implemented by the configuration bitstream may vary. Some require a global asynchronous reset, and make it synchronous within the core, while others may require a synchronous reset. Other circuits may employ a bus reset as their reset input. Other circuits such as an embedded processor may make reset requests. Accordingly, reset circuits within an integrated circuit may vary greatly.

SUMMARY OF THE INVENTION

A method of enabling the generation of reset signals in an integrated circuit is disclosed. The method comprises receiving information related to reset ports for a plurality of intellectual property cores in a design tool; providing an intellectual property core comprising a reset logic circuit adapted to generate a plurality of reset signals for the plurality of intellectual property cores; and generating, by the design tool, configuration data enabling programmable interconnects to couple a first reset signal of the plurality of reset signals to a first intellectual property core of the plurality of intellectual property cores and a second reset signal of the plurality of reset signals to a second intellectual property core of the plurality of intellectual property cores.

According to an alternate embodiment, a method of enabling the generation of reset signals in an integrated circuit comprises receiving, in a design tool, information related to reset ports of a plurality of intellectual property cores; receiving, in the design tool, information related to a reset port of the integrated circuit; providing an intellectual property core comprising a reset logic circuit adapted to generate a plurality of reset signals for the plurality of intellectual property cores; and generating configuration data enabling programmable interconnects to couple a first reset signal of the plurality of reset signals to a first intellectual property core of the plurality of intellectual property cores and the second reset signal of the plurality of reset signals to a second intellectual property core of the plurality of intellectual property cores, and to couple the reset port of the integrated circuit to the reset logic circuit.

A method of enabling the generation of reset signals in an integrated circuit according to a further embodiment comprises receiving, in a design tool, information related to reset ports of a plurality of intellectual property cores; providing an intellectual property core comprising a reset logic circuit adapted to generate a first reset logic signal and a second reset logic signal for the plurality of intellectual property cores; generating configuration data enabling programmable interconnects to couple the first reset signal to a first intellectual property core of the plurality of intellectual property cores and the second reset signal to a second intellectual property core of the plurality of intellectual property cores; coupling the configuration data to the integrated circuit; and configuring the integrated circuit using the configuration data.

DETAILED DESCRIPTION

Figure 1:
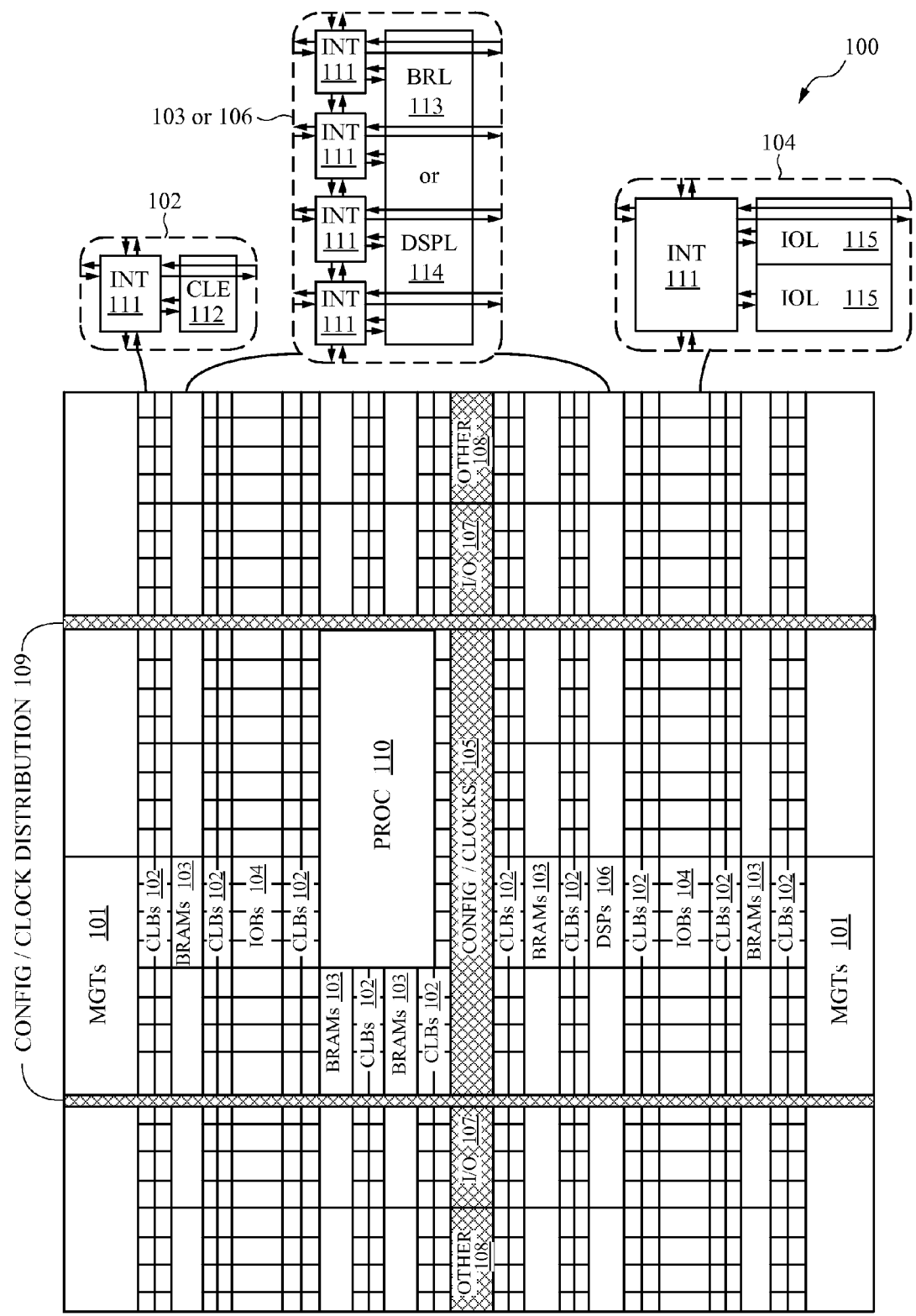
FIG. 1 is a block diagram of a device having configurable logic according to an embodiment the present invention.

Turning first to FIG. 1, a block diagram of a device having configurable logic according to an embodiment the present invention is shown. The device of FIG. 1 comprises an FPGA architecture 100 having a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 may include a configurable logic element (CLE 112) that may be programmed to implement user logic plus a single programmable interconnect element (INT 111). A BRAM 103 may include a BRAM logic element (BRL 113) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL 114) in addition to an appropriate number of programmable interconnect elements. An 10B 104 may include, for example, two instances of an input/output logic element (IOL 115) in addition to one instance of the programmable interconnect element (INT 111). The location of connections of the device is controlled by configuration data bits of a configuration bitstream provided to the device for that purpose. As will be described in more detail below, the programmable interconnects, in response to bits of a configuration bitstream, enable connections comprising interconnect lines to be used to couple the reset signals from reset logic to one or more circuits of the integrated circuit, or reset requests from one or more circuits of the integrated circuit to the reset logic.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of integrated circuit having programmable logic.

Figure 2:
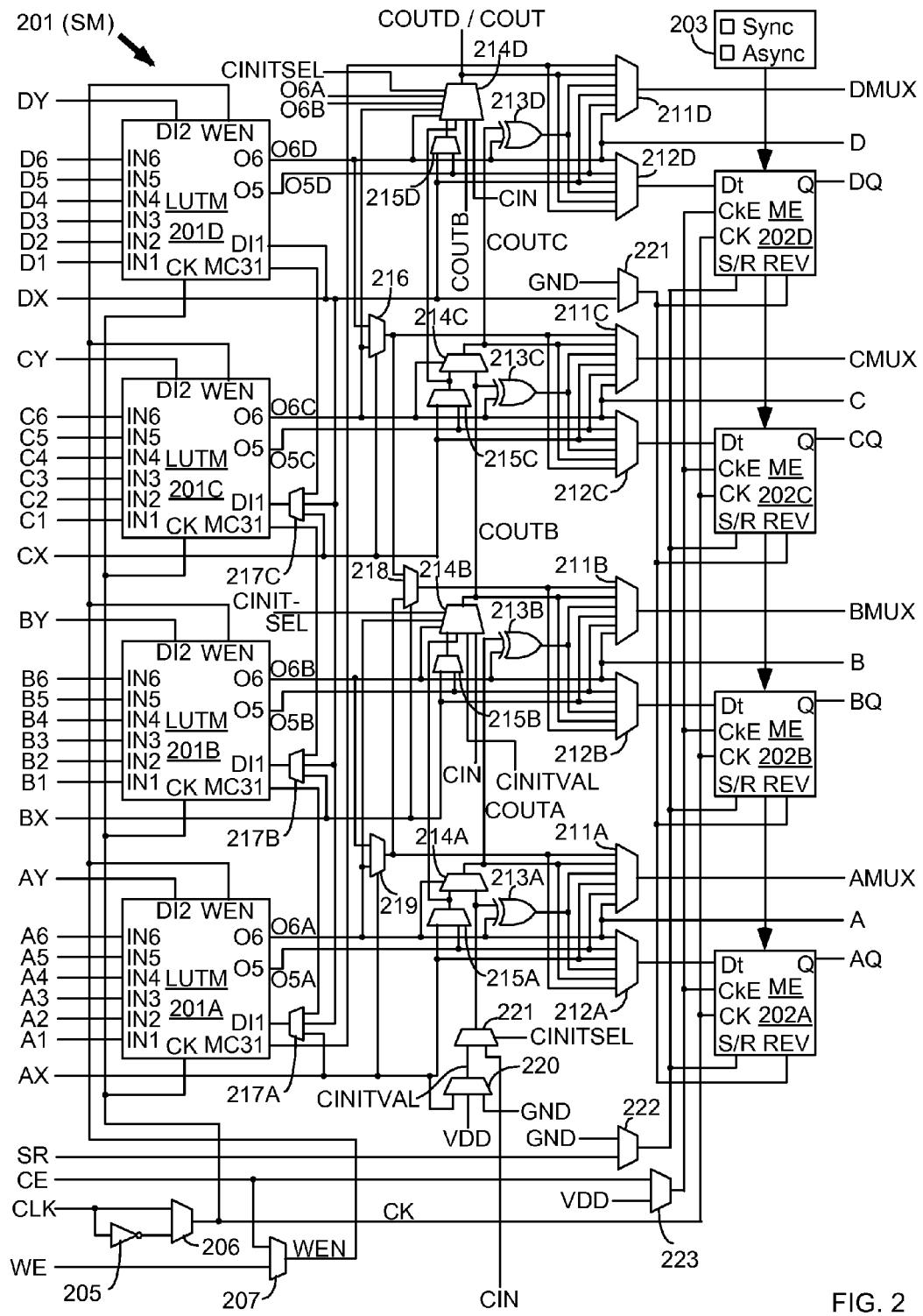
FIG. 2 is a configurable logic element of the device of FIG. 1 according to an embodiment of the present invention.

Turning now to FIG. 2, a configurable logic element of the device of FIG. 1 according to an embodiment of the present invention is shown. In particular, FIG. 2 illustrates in simplified form a configurable logic element of a configuration logic block 102 of FIG. 1. In particular, FIG. 2 illustrates in simplified form a configurable logic element of a configuration logic block 102 of FIG. 1. In the embodiment of FIG. 2, slice M 201 includes four lookup tables (LUTMs) 201A-201D, each driven by six LUT data input terminals A1-A6, B1-B6, C1-C6, and D1-D6 and each providing two LUT output signals O5 and O6. The O6 output terminals from LUTs 201A-201D drive slice output terminals A-D, respectively. The LUT data input signals are supplied by the FPGA interconnect structure via input multiplexers, which may be implemented by programmable interconnect element 111, and the LUT output signals are also supplied to the interconnect structure. Slice M also includes: output select multiplexers 211A-211D driving output terminals AMUX-DMUX; multiplexers 212A-212D driving the data input terminals of memory elements 202A-202D; combinational multiplexers 216, 218, and 219; bounce multiplexer circuits 222-223; a circuit represented by inverter 205 and multiplexer 206 (which together provide an optional inversion on the input clock path); and carry logic having multiplexers 214A-214D, 215A-215D, 220-221 and exclusive OR gates 213A-213D. All of these elements are coupled together as shown in FIG. 2. Where select inputs are not shown for the multiplexers illustrated in FIG. 2, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 2 for clarity, as well as from other selected figures herein. In the pictured embodiment, each memory element 202A-202D may be programmed to function as a synchronous or asynchronous flip-flop or latch. The selection between synchronous and asynchronous functionality is made for all four memory elements in a slice by programming Sync/Asynch selection circuit 203. When a memory element is programmed so that the S/R (set/reset) input signal provides a set function, the REV input terminal provides the reset function. When the memory element is programmed so that the S/R input signal provides a reset function, the REV input terminal provides the set function. Memory elements 202A-202D are clocked by a clock signal CK, which may be provided by a global clock network or by the interconnect structure, for example. Such programmable memory elements are well known in the art of FPGA design. Each memory element 202A-202D provides a registered output signal AQ-DQ to the interconnect structure. Because each LUT 201A-201D provides two output signals, O5 and O6, the LUT may be configured to function as two 5-input LUTs with five shared input signals (IN1-IN5), or as one 6-input LUT having input signals IN1-IN6. In the embodiment of FIG. 2, each LUTM 201A-201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 217A-217C for LUTs 201A-201C), or to the two 32-bit RAMs via input terminals DI1 and DI2. RAM write operations in the LUT RAMs are controlled by clock signal CK from multiplexer 206 and by write enable signal WEN from multiplexer 207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 201A may also be provided to the general interconnect structure for shift register chaining, via output select multiplexer 211D and CLE output terminal DMUX.

Figure 3:
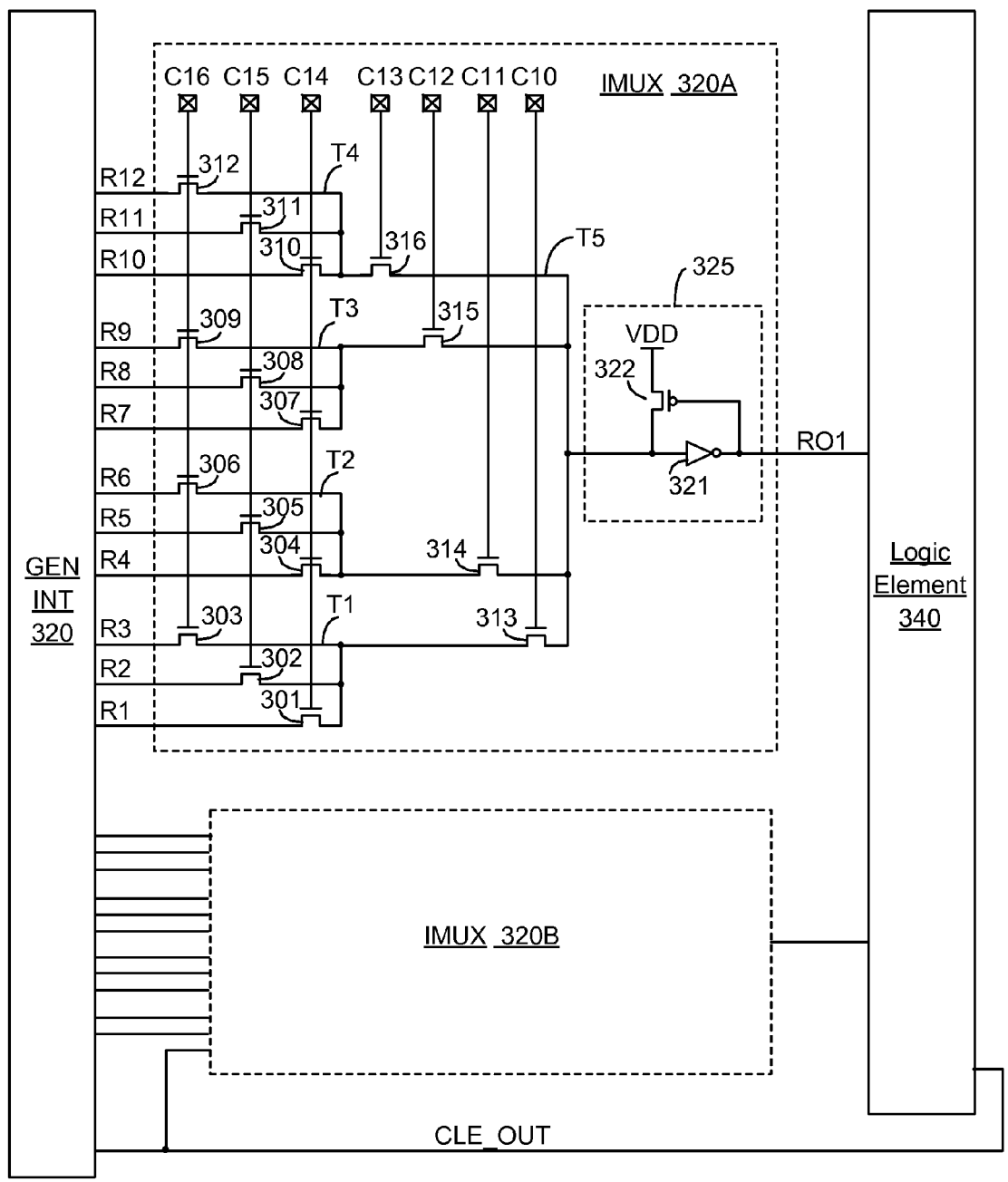
FIG. 3 is a block diagram of interconnect multiplexers used to provide programmable interconnect elements between a general interconnect structure and configurable logic elements.

FIG. 3 illustrates how a programmable input multiplexer may be used to provide programmable interconnect elements between the general interconnect structure and a configurable logic element. An input multiplexer provides the ability to select one of many different interconnect lines to provide a signal to a CLE input terminal. An input multiplexer can be implemented, for example, as shown in FIG. 3. The illustrated circuit selects one of several different input signals and passes the selected signal to an output terminal. Note that FIG. 3 illustrates an input multiplexer with twelve inputs, but PLD input multiplexers typically have many more inputs, e.g., 20, 24, 28, 30, 36, or some other number. However, FIG. 3 illustrates a smaller circuit, for clarity.

The circuit of FIG. 3 includes twelve input terminals R1-R12 and sixteen pass gates 301-316. Pass gates 301-303 selectively pass one of input signals R1-R3, respectively, to a first internal node T1. Each pass gate 301-303 has a gate terminal driven by a configuration memory cell C14-016, respectively. Similarly, pass gates 304-306 selectively pass one of input signals R4-R6, respectively, to a second internal node T2. Each pass gate 304-306 has a gate terminal driven by one of the same configuration memory cells C14-016, respectively. From internal nodes T1, T2, pass gates 313, 314 are controlled by configuration memory cells C10, C11, respectively, to selectively pass at most one signal to another internal node T5.

Pass gates 307-312 and 315-316 are similarly controlled by configuration memory cells C12-016 to select one of input signals R7-R12 and to pass the selected input signal via one of internal nodes T3, T4 to internal node T5, as shown in FIG. 3. The signal on internal node T5 is buffered by buffer 325 to provide output signal R01. Buffer 325 includes an inverter 321 and a pull-up (e.g., a P-channel transistor 322 to power high VDD) on internal node T5 and driven by the output of inverter 321. Thus, values stored in configuration memory cells C10-C16 select at most one of the input signals R1-R12 to be passed to internal node T5, and hence to output node R01. If none of the input signals is selected, output signal RO1 is held at its initial high value by pull-up 322. As will be described in more detail below, the various embodiments of FIGS. 4-10 may be implemented in configurable logic blocks. For example, the IP cores and reset logic may be implemented in configurable logic blocks of FIGS. 1-2 and coupled together by programmable interconnect elements of FIG. 3.

Figure 4:
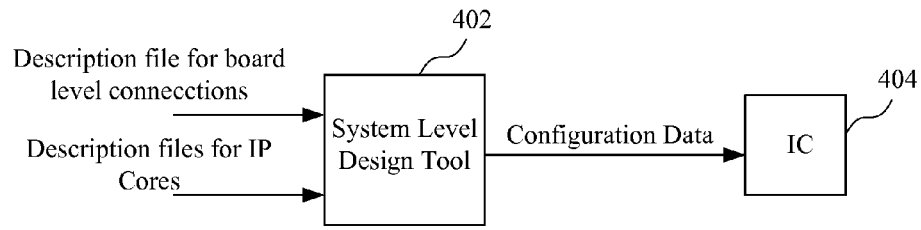
FIG. 4 is a block diagram of a system for enabling generating reset signals in an integrated circuit having configurable logic according to an embodiment of the present invention.

Turning now to FIG. 4, a block diagram of a system for implementing a method of enabling the generation of reset signals in an integrated circuit is shown. In particular, a system level design tool 402 is coupled to receive description files for both board level connections and for IP cores. The description file for board level connections may comprise, among other information, input and output information related to integrated circuit (IC) devices on a circuit board, such as integrated circuit 404. For example, the description file for the board level connections may contain information related to the pin configuration of a device having programmable logic, and particularly reset signals for the device. In addition to the location of the pins, that information may also include whether an active high reset or active low reset is required for a given reset signal. Similarly, the description files for the IP cores of the IC device may comprise information related to the various reset ports of the IP core, including reset inputs and reset outputs, as will be described in more detail below. The system level design tool generates configuration data for integrated circuit 404. If integrated circuit 404 comprises a device having programmable logic, the configuration data may comprise a configuration bitstream for providing the necessary interconnections for the reset logic and IP cores of the IC device. That is, the configuration data in configuration memory cells will enable the appropriate connections between the elements of the IC device, such as the programmable interconnect elements set forth above with respect to FIGS. 1-3. The system level design tool may comprise a software tool implemented on a general purpose computer for generating configuration data to implement the various connections as shown in the circuits set forth below. While the system level tool may implement other aspects of enabling a circuit design in an IC device, such as packing and placement, the system level tool automatically generates the necessary routing from input/output (I/O) pins of the device to a reset logic core and between the reset logic core and IP cores implemented in the device using programmable interconnect elements based upon the information in the description files.

Figure 5:
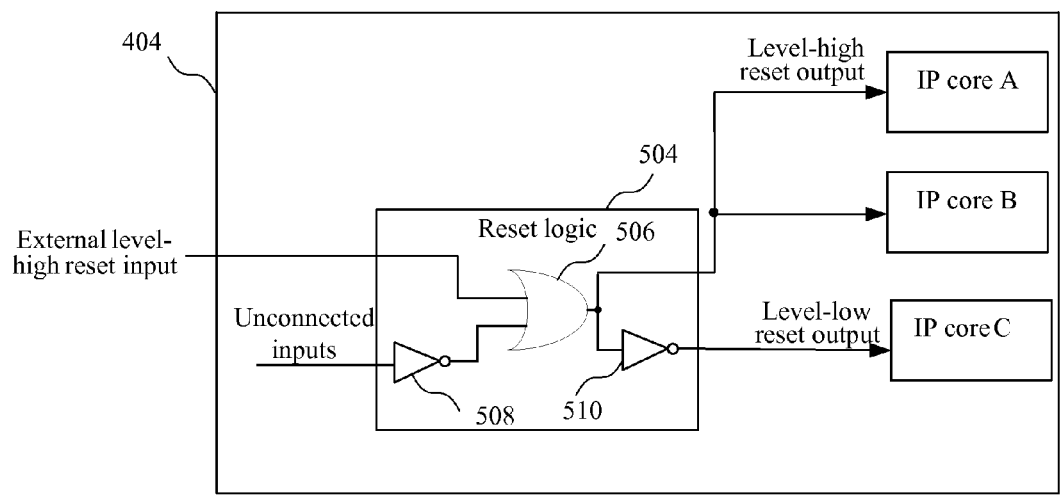
FIG. 5 is a block diagram having reset logic for a plurality of circuits of an integrated circuit device according to an embodiment of the present invention.

Turning now to FIG. 5, a block diagram of an integrated circuit having reset logic for a plurality of circuits of the integrated circuit device according to an embodiment of the present invention is shown. The internal reset supplies of the integrated circuit are preferably created by instantiating a single reset module in the IC device. The module may be, for example, a hardware description language (HDL) core which will accept any one of a plurality of input reset signals, and produce a plurality of output reset signals. These output reset signals are coupled to a plurality of IP cores. IP cores comprise predefined functions that may be added as an element of a larger circuit design. The IP cores are provided to the integrated circuit in a required format that may be easily added to the circuit design. For example, IP cores may comprise code licensed from a third party software developer, and may be implemented directly in silicon, either in fixed logic or programmable logic elements. In the case of a device having programmable logic, the IP core may comprise a portion of a configuration bitstream.

IP cores may be obtained from a variety of sources. A Xilinx CORE Generator System product available from Xilinx, Inc. of San Jose, Calif. is a cataloging, customization, and delivery vehicle for IP cores targeted to Xilinx devices. The CORE Generator System provides centralized access to IP functions ranging in complexity from simple arithmetic operators to system-level building blocks. The use of IP cores in designs enables designers to shorten design time, and it also helps them realize high levels of performance and area efficiency without any special knowledge of the architecture of the device. Types of IP cores currently offered by the Xilinx include basic elements, such a logic gates, registers, multiplexers, adders, multipliers; communications and networking elements such as ADPCM modules, HDLC controllers, ATM building blocks, forward error correction modules, and POS-PHY Interfaces; DSP and Video Image Processing cores ranging from small building blocks to larger system-level functions; system logic such as accumulators, adders, subtracters, complementers, multipliers, integrators, pipelined delay elements; single and dual-port distributed and block RAM, ROM, and synchronous and asynchronous FIFOs; and standard bus interfaces such as PCI Interfaces.

As shown in FIG. 5, integrated circuit 404 comprises a reset logic circuit 504. The reset logic circuit may comprise an external reset, shown here as a level-high reset, such as a logical "1," coupled to an OR gate 506. For example, the OR gate may also be coupled to receive unconnected inputs by way of an invertor 508. As will be described in more detail below, the unconnected inputs may be outputs of IP cores. In FIG. 5, IP cores A and B have a requirement that their system reset be a level-high system reset. The output of the OR gate 506 may also be coupled to an inverter 510 to generate a level-low output, such as a logical "0," shown here coupled to an IP core C.

When a designer attempts to compile a design on an integrated circuit within existing workflows, a description of the environment in which the integrated circuit is implemented may be available. The board upon which the integrated circuit is to be mounted may have been described, and the pin locations for any reset signals may have been identified. The sensitivity of those signals, such as active high or active low signals, may be known. This information may be held within description files, such as constraint files for example. Similarly, each reset port on IP cores to be implemented is identified and its sensitivity requirements known. This information may be held within description files for those IP cores, rather than as an intrinsic part of the HDL specification. The inputs of the integrated circuit are examined to identify external reset supplies, and any external reset supply such as a system reset is connected to the matching input port on the reset logic core. All other IP cores within the design are then examined. When an unconnected port defined as a reset input is identified, it is connected to the matching sensitivity reset output on the reset logic core. Accordingly, a single reset logic core is sufficient to meet the reset requirements of the entire design.

Figure 6:
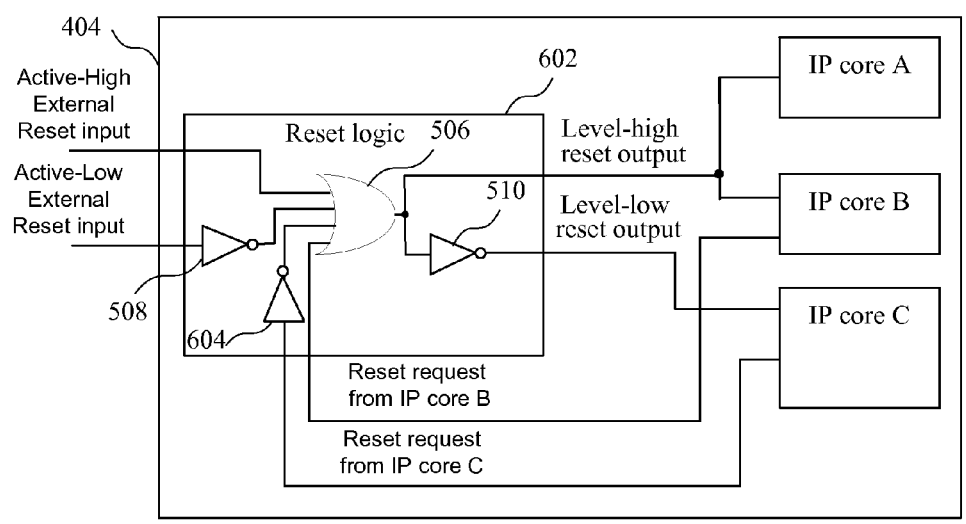
FIG. 6 is a block diagram having reset logic for a plurality of circuits and receiving a reset request from a circuit of an integrated circuit device according to an embodiment of the present invention.

While the embodiment of FIG. 5 only allows a system reset to be triggered by an external reset from outside the integrated circuit, a design may require an IP core to trigger a reset. For example, a processor may need to carry out a hard reset of the system. As shown in FIG. 6, reset logic for the plurality of IP cores may receive a reset request from a circuit such as an IP core of an integrated circuit. In particular, IP core B provides a reset request, which may be a level high reset request, to reset logic 602, while IP core C provides a level-low reset request to an inverter 604. Therefore, a list of the unconnected reset outputs and the unconnected reset inputs within the design is created. Each unconnected reset input of an IP core is connected to the reset output on the reset logic core, and each unconnected reset output of an IP core is connected to a reset request input on the reset logic core. The reset logic core is therefore expanded in the embodiment of FIG. 6 so that its reset outputs are triggered in response to both internal as well as external reset stimuli.

Figure 7:
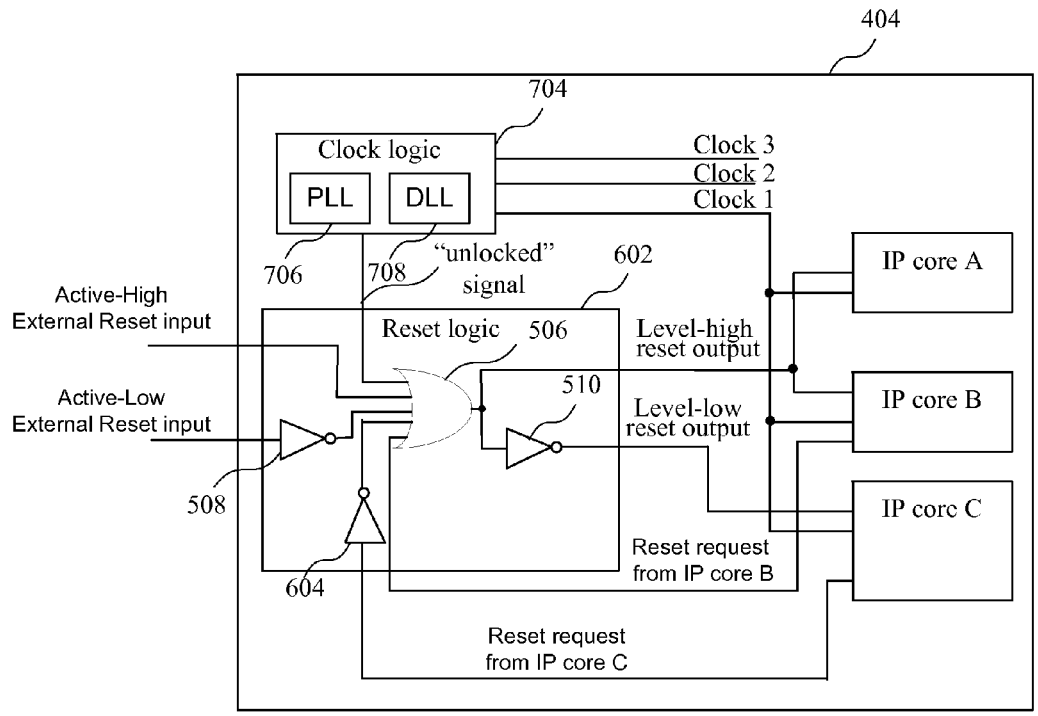
FIG. 7 is a block diagram having reset logic for a plurality of circuits of an integrated circuit device having a clock logic for controlling the reset logic according to an embodiment of the present invention.

Turning now to FIG. 7, a block diagram shows reset logic for a plurality of circuits of an integrated circuit device having a clock logic for controlling the reset logic according to an embodiment of the present invention. The integrated circuit 404 of FIG. 7 comprises a clock logic circuit 704 having a phase-locked loop (PLL) 706 and delay-locked loop (DLL) 708. Because these devices may take some time after power-up to lock to their correct frequency, the clock signals generated by these devices cannot be guaranteed to be correct or stable. According to the circuit of FIG. 7, the clock logic circuit 704 generates an "unlocked" signal indicating that one or more clocks generated by the clock logic is not locked. By coupling the "unlocked" signal to the reset logic, the clock logic holds the reset logic core in reset until all of the clock signals are locked.

Figure 8:
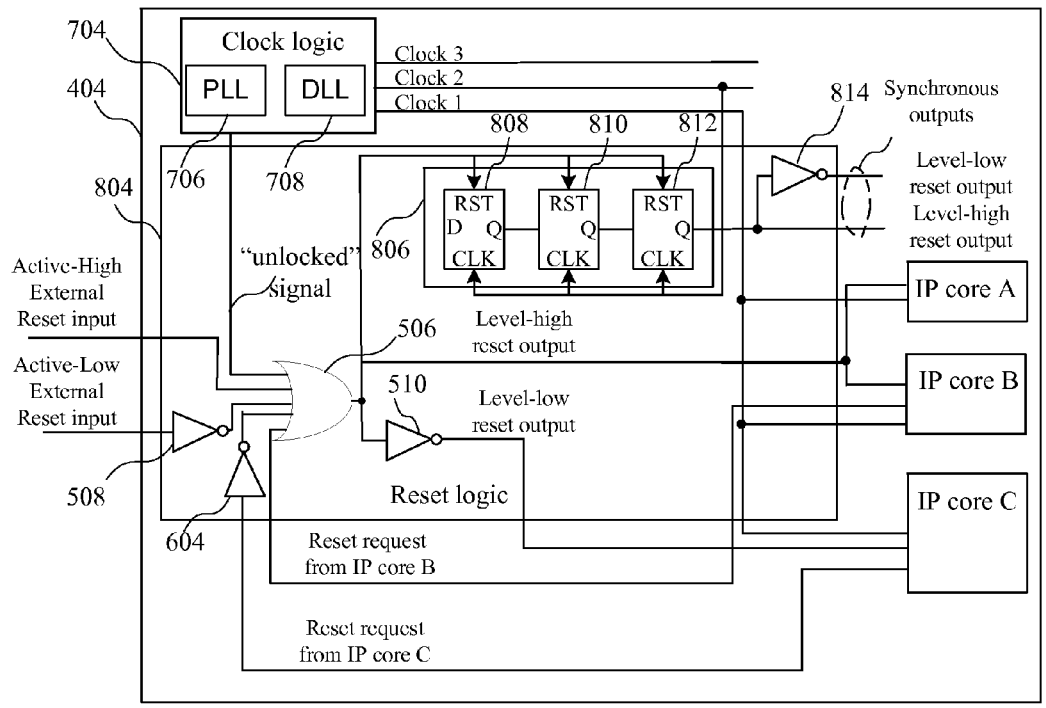
FIG. 8 is a block diagram having reset logic generating synchronous outputs for a plurality of circuits of an integrated circuit device according to an embodiment of the present invention.
Figure 9:
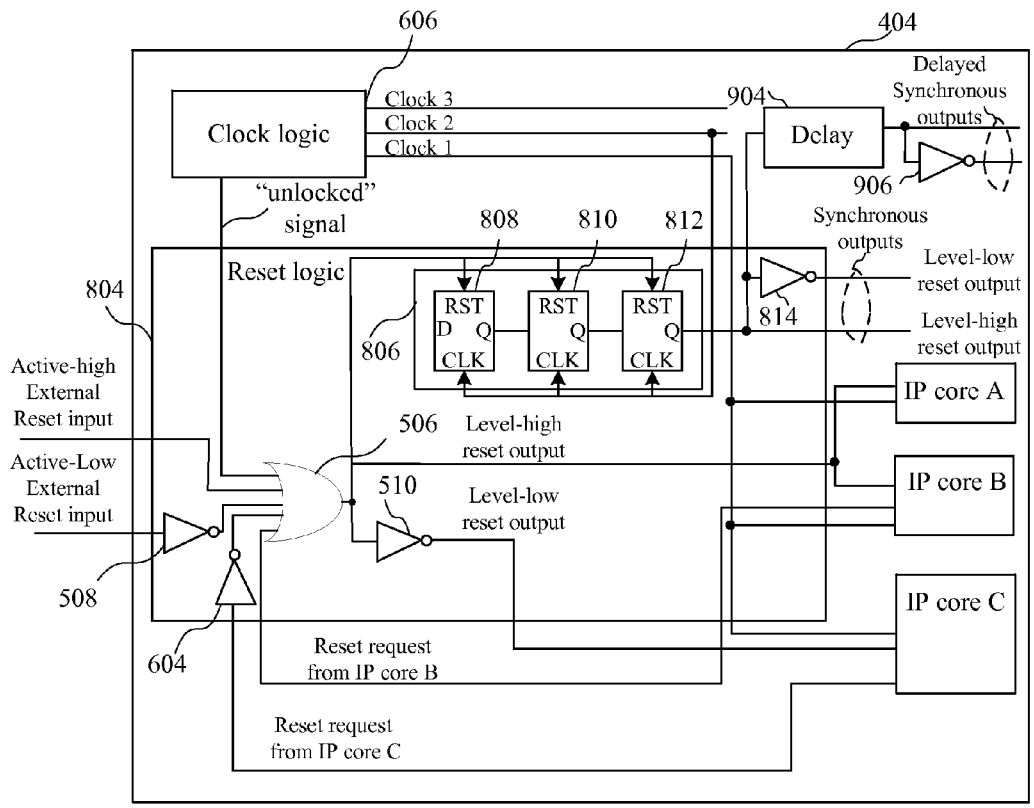
FIG. 9 is a block diagram having reset logic generating synchronous and delayed synchronous outputs for a plurality of circuits of an integrated circuit device according to an embodiment of the present invention.

Turning now to FIG. 8, a block diagram having reset logic 804 generating synchronous outputs for a plurality of circuits of an integrated circuit device according to an embodiment of the present invention is shown. Because it may be necessary to skew-balance reset trees within the design, pseudo-synchronous reset signals within logic blocks may be used. In such cases, the asynchronous input is used to drive a synchronizer register chain within the logic, as shown in FIG. 8. The result of the use of the synchronization register chain is an implicit clock domain associated with reset signals which are externally described as "asynchronous." The reset signals are therefore considered to be part of a reset domain, which is partitioned alongside the associated clock domain for the cores concerned, as will be described in more detail below. This reset logic receives the desired clock, Clock 2 according to the embodiment of FIG. 7, and the asynchronous reset, shown here as the level-high reset output of the OR gate 506, as inputs. In particular, the synchronous reset logic circuit 806 comprises a plurality of flip-flops 808-812 which are connected in series and each coupled to receive a clock signal at a clock input and the asynchronous reset output of OR gate 506 at a reset (RST) input. The D input of the flip-flop 808 is coupled to ground and the Q output of the flip flop 812 provides the synchronous outputs. By coupling an inverter 814 to the output, both level-low and level-high outputs are generated. As shown in the circuit of FIG. 9, delayed synchronous outputs may be generated for a plurality of circuits of an integrated circuit device by using a delay circuit 904. Although the delay circuit 904 is shown at the output of the synchronizer register chain 806, the delay circuit 904 or some other delay circuit may be placed at the output of the OR gate 506.

Figure 10:
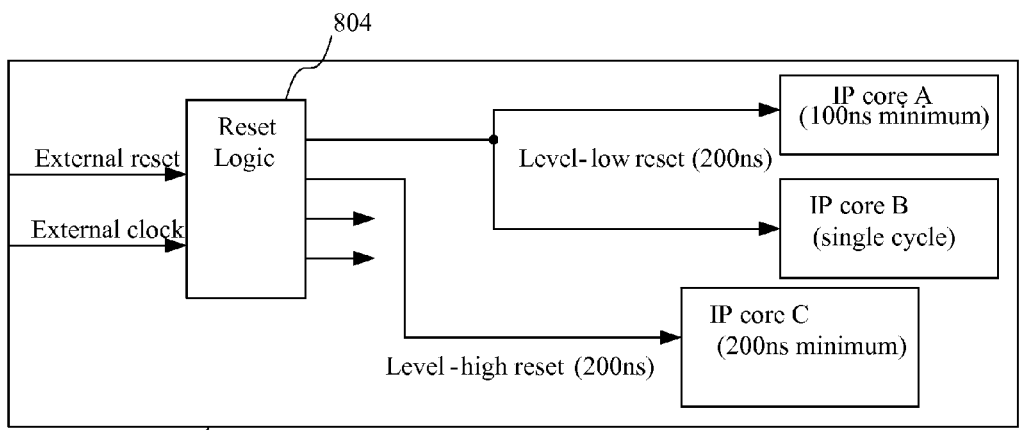
FIG. 10 is a block diagram of an integrated circuit comprising circuits having different timing requirements according to an embodiment of the present invention.

Turning now to FIG. 10, a block diagram of an integrated circuit comprising circuits having different timing requirements according to an embodiment of the present invention is shown. In order to ensure that the output of the reset logic will properly reset the IP cores, the reset requirements of the system are analyzed. A list of all unconnected reset inputs on all IP cores within the design is created, and examined for duration requirements. The longest duration reset requirement is used to parameterize the reset core, wherein the reset signal comprises a predetermined duration which is at least as long as the duration of the IP core requiring the longest duration. That is, if an IP core requires that reset be held for a certain number of clock cycles or a certain duration in time, all reset outputs produced by the reset core will have this duration to ensure that all IP cores within the system will be correctly reset by a system reset. The duration of the reset signal may be determined using a free-running external clock to ensure that the required period for the reset is accurate, or by determining the period after the PLL/DLL generated clocks are locked onto their desired operating frequency. As shown in FIG. 10, the integrated circuit 404 comprises reset logic 804 coupled to IP cores having different requirements for a reset clock signal. While IP core A requires only a reset signal having a minimum of 100 nanoseconds (ns), IP core C requires a reset signal having a minimum of 200 ns. Accordingly, the output of the reset logic will be held high for the predetermined period of time of 200 ns. By way of example, the output of the OR gate 506 or synchronous reset logic 806 may be coupled to a hold circuit for holding the falling edge of the output for a predetermined period to generate a reset signal having the desired pulse width of 200 ns.

Figure 11:
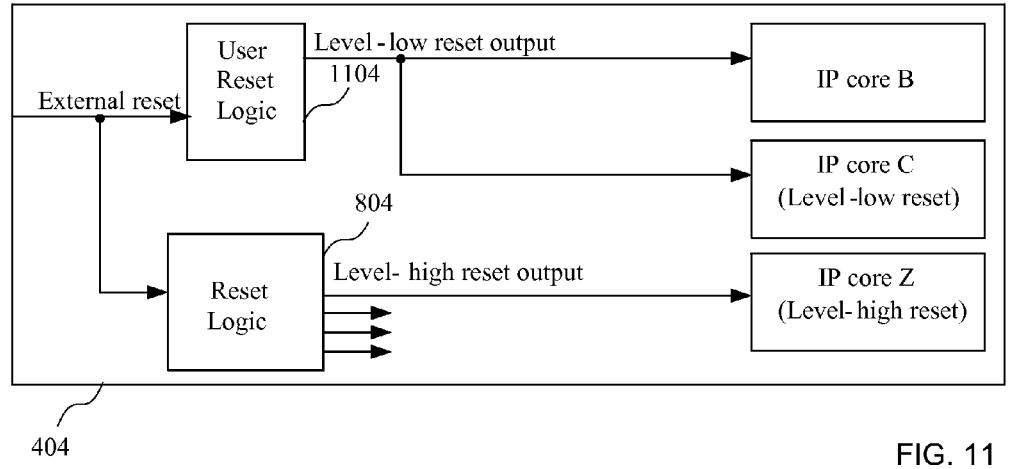
FIG. 11 is a block diagram of an integrated circuit having reset logic which supplements existing reset logic according to an embodiment of the present invention.

Turning now to FIG. 11, a block diagram of an integrated circuit having reset logic which supplements existing reset logic according to an embodiment of the present invention is shown. According to the embodiment of FIG. 11, integrated circuit 404 may comprise user reset logic 1104 which exists for certain cores, and the reset logic circuit 804, which may comprise any of the reset logic circuits set forth above in FIGS. 5-10. That is, because reset logic may already exist for certain IP cores, existing reset logic will be used with those cores, and the reset logic circuit 804 will be implemented in the integrated circuit and used with the remaining cores. Accordingly, in addition to carrying out an analysis of the reset requirements of the system, it would be necessary to carry out an analysis of the reset resources already available within the system. In addition to the list of reset requirements, a list of the existing reset resources within the design is created and may be grouped according to certain factors such as sensitivity and duration. The existing reset resources are then connected to the reset outputs of the reset logic circuit or reset requests of the IP cores where possible, and the remainder of the list of reset outputs or requests is implemented in reset logic core as set forth above.

Figure 12:
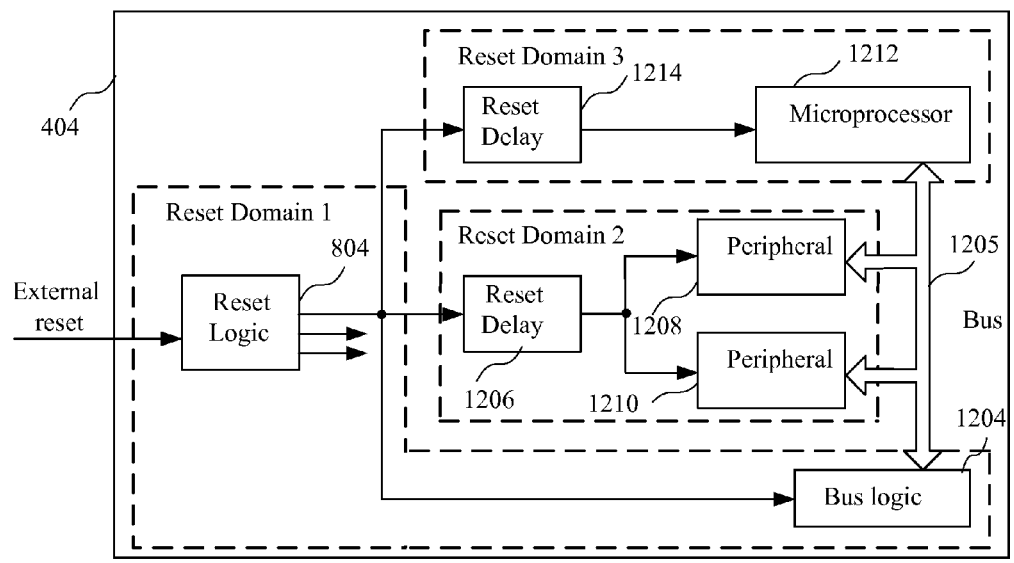
FIG. 12 is a block diagram of an integrated circuit having reset logic for different domains according to an embodiment of the present invention.

Turning now to FIG. 12, a block diagram of an integrated circuit having reset logic for different domains according to an embodiment of the present invention is shown. While the methods and circuits set forth above create a single reset domain across the entire design, it may be desirable in bus-connected systems to bring up the system in stages, thus reducing the chances that a reset artifact on the bus will cause unpredictable behavior in connected logic. Because bus logic and microprocessor logic are identified within FPGA designs in order to carry out design-rule checking, this identification may also be used in establishing reset domains. According to one method of the present invention, establishing rest domains may be addressed by examining the design, and identifying bus logic within the system. The reset input of such a core having bus logic is not delayed. Rather, it is kept within the original reset domain, shown as Reset Domain 1 for example, by reset logic 804 in FIG. 12. A list of all cores connected to that bus logic 1204 by a bus 1205 is then made. These cores are grouped within a new reset domain shown as Reset Domain 2 in FIG. 12, and a piece of logic is instantiated which causes them to remain in reset for longer than the original reset domain. For example, a reset delay circuit 1206 is coupled to peripherals 1208 and 1210. If one or more microprocessor cores 1212 are connected to that bus logic, they are grouped in a separate reset domain from the other bus peripherals, and delayed yet further by a reset delay 1214 as shown in Reset Domain 3 in FIG. 12. While three domains are shown by way of example, any number of domains may be employed.

Figure 13:
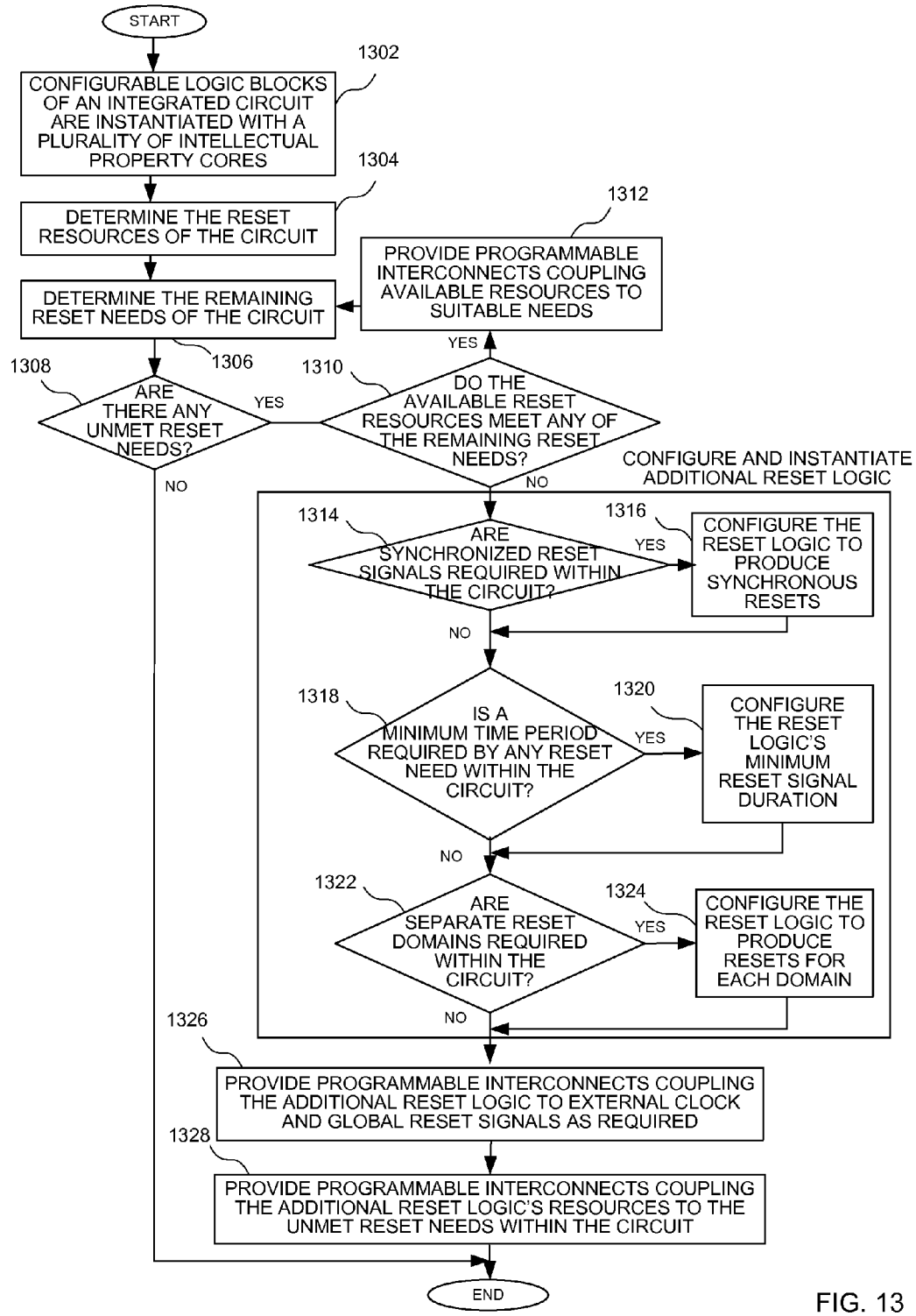
FIG. 13 is a flow chart showing a method of enabling generating reset signals in an integrated circuit device according to an embodiment the present invention.

Turning now to FIG. 13, a flow chart shows a method of enabling the generation of reset signals in an integrated circuit device according to an embodiment the present invention. In order to determine an appropriate reset scheme in designs which contain IP cores, the identity of reset ports in an IP core and reset pins on the integrated circuit, and their high or low level sensitivity and duration, are determined. Because this information may be used to assist hardware synthesis tools in checking a design against a set of design rules, the methods of the present invention may use this information to generate connections between internal reset requests, internal reset inputs and appropriate reset resources. Where appropriate reset resources do not exist, the methods instantiate circuitry in order to meet the reset request and reset input requirements of the design.

Configurable logic blocks of the integrated circuits are instantiated with a plurality of intellectual property cores at a step 1302, and any reset resources associated with the circuit are determined to be available at a step 1304. The remaining reset needs of the circuit are determined at a step 1306. It is then determined whether there are any unmet reset needs at a step 1308. If so, it is determined whether the available reset resources meet any of the remaining reset needs at a step 1310. If so, programmable interconnects coupling existing reset resources to the identified reset needs are provided at a step 1312, and the reset needs of the circuit are then re-evaluated at a step 1306.

The additional reset logic instantiated is then configured according to the set of reset needs determined within step 1306. Should synchronous reset signals be demanded within the circuit as determined at a step 1314, the additional reset logic is configured to provide them at a step 1316. Should minimum reset periods be demanded within the circuit as determined at a step 1318, the minimum reset signal duration is calculated and set at a step 1320. Should separate reset domains be required within the circuit as determined at a step 1322, the logic is configured to produce separate reset signal groups for each domain at a step 1324.

If unmet needs remain, additional reset logic is configured and instantiated to provide further reset resources. Programmable interconnects coupling the additional reset logic control inputs to external clocks and resets are provided at a step 1326, and programmable interconnects coupling the additional reset logic's resources to the unmet reset needs within the circuit are provided at a step 1328. It should be noted that "reset needs" with respect to IP cores, refers both to reset command inputs and to reset request outputs.

It can therefore be appreciated that the new and novel integrated circuit and method of generating reset signals in an integrated circuit has been described. For example, while various features are shown in different embodiments, these individual features of the various embodiments could be combined, or all of them could be employed in a single embodiment. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A method of enabling the generation of reset signals in an integrated circuit, the method comprising:
    receiving, in a design tool, information related to reset ports for a plurality of intellectual property cores;
    providing an intellectual property core comprising a reset circuit adapted to generate a plurality of reset signals for the plurality of intellectual property cores; and
    generating, by the design tool, configuration data enabling programmable interconnects to couple a first reset signal of the plurality of reset signals to a first intellectual property core of the plurality of intellectual property cores and a second reset signal of the plurality of reset signals to a second intellectual property core of the plurality of intellectual property cores.

2. The method of claim 1 further comprising determining the reset requirements of the plurality of intellectual property cores.

3. The method of claim 2 wherein providing an intellectual property core comprising a reset circuit comprises providing an intellectual property core which generates reset signals to meet the reset requirements of the plurality of intellectual property cores.

4. The method of claim 2 further comprising determining the reset resources of the plurality of intellectual property cores.

5. The method of claim 4 wherein providing an intellectual property core comprising a reset circuit comprises providing an intellectual property core which generates reset signals to meet the reset requirements of the plurality of intellectual property cores which are not met by the determined reset resources of the plurality of intellectual property cores.

6. The method of claim 2 wherein determining the reset requirements of the plurality of intellectual property cores comprises determining reset outputs of the plurality of intellectual property cores which generates reset requests.

7. The method of claim 6 wherein generating, by the design tool, configuration data enabling programmable interconnects comprises generating configuration data enabling programmable interconnects between a reset output of an intellectual property core and a reset input of the reset circuit.

8. A method of enabling the generation of reset signals in an integrated circuit, the method comprising:
receiving, in a design tool, information related to reset ports of a plurality of intellectual property cores;
receiving, in the design tool, information related to a reset port of the integrated circuit;
providing an intellectual property core comprising a reset circuit adapted to generate a plurality of reset signals for the plurality of intellectual property cores; and
generating configuration data enabling programmable interconnects to couple a first reset signal of the plurality of reset signals to a first intellectual property core of the plurality of intellectual property cores and a second reset signal of the plurality of reset signals to a second intellectual property core of the plurality of intellectual property cores, and to couple the reset port of the integrated circuit to the reset circuit.

9. The method of claim 8 further comprising determining the reset outputs of the plurality of intellectual property cores, wherein generating configuration data enabling programmable interconnects comprises generating configuration data enabling programmable interconnects between a reset output of an intellectual property core and a reset input of a reset logic circuit.

10. The method of claim 9 further comprising determining a reset output of a second intellectual property core, wherein generating configuration data comprises generating configuration data enabling programmable interconnects between the reset output of the second intellectual property core and a second reset input of the reset circuit.

11. The method of claim 8 wherein generating configuration data further comprises generating configuration data enabling generating a signal indicating whether a clock of a clock circuit for generating the reset signals is locked.

12. The method of claim 8 wherein generating configuration data further comprises generating configuration data enabling generating synchronized reset signals by way of a synchronization circuit.

13. The method of claim 8 wherein generating configuration data further comprises generating configuration data enabling generating delayed reset signals by way of a delay circuit.

14. The method of claim 8 wherein generating configuration data further comprises generating configuration data enabling generating a delay in a reset signal generated in the at least one domain of a plurality of domains.

15. A method of enabling the generation of reset signals in an integrated circuit, the method comprising:
receiving, in a design tool, information related to reset ports of a plurality of intellectual property cores;
providing an intellectual property core comprising a reset circuit adapted to generate a first reset logic signal and a second reset signal for the plurality of intellectual property cores;
generating configuration data enabling programmable interconnects to couple the first reset signal to a first intellectual property core of the plurality of intellectual property cores and the second reset signal to a second intellectual property core of the plurality of intellectual property cores;
coupling the configuration data to the integrated circuit; and
configuring the integrated circuit using the configuration data.

16. The method of claim 15 wherein generating configuration data further comprises generating configuration data enabling coupling an external clock signal to the reset circuit.

17. The method of claim 15 wherein generating configuration data further comprises generating configuration data enabling generating a signal indicating whether a clock coupled to the reset circuit is locked.

18. The method of claim 15 wherein generating configuration data further comprises generating configuration data enabling generating a synchronized reset signals by way of a synchronization circuit.

19. The method of claim 15 wherein generating configuration data further comprises generating configuration data enabling generating delayed reset signals by way of a delay circuit.

20. The method of claim 15 wherein generating configuration data further comprises generating configuration data enabling a delayed reset signal in at least one domain of a plurality of domains.

* * * * *